United States Patent
Liguori et al.

(10) Patent No.: US 11,157,332 B2
(45) Date of Patent: Oct. 26, 2021

(54) DETERMINING WHEN TO RELEASE A LOCK FROM A FIRST TASK HOLDING THE LOCK TO GRANT TO A SECOND TASK WAITING FOR THE LOCK

(71) Applicant: INTERNATIONAL BUSINESS MACHINES CORPORATION, Armonk, NY (US)

(72) Inventors: Gregg L. Liguori, Hyde Park, NY (US); Franklin E. McCune, Tucson, AZ (US); David C. Reed, Tucson, AZ (US); Michael R. Scott, Ocean View, HI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 15/202,955

(22) Filed: Jul. 6, 2016

(65) Prior Publication Data

US 2018/0011744 A1    Jan. 11, 2018

(51) Int. Cl.
*G06F 9/52*      (2006.01)
*G06F 9/48*      (2006.01)
*G06F 9/50*      (2006.01)

(52) U.S. Cl.
CPC ............ *G06F 9/526* (2013.01); *G06F 9/4881* (2013.01); *G06F 9/5038* (2013.01)

(58) Field of Classification Search
CPC ...................................................... G06F 9/526
See application file for complete search history.

(56) References Cited

U.S. PATENT DOCUMENTS

| 5,274,809 A | * | 12/1993 | Iwasaki | G06F 9/526 710/200 |
| 6,189,007 B1 | * | 2/2001 | Boonie | G06F 16/2343 707/611 |
| 6,560,627 B1 | * | 5/2003 | McDonald | G06F 9/52 718/100 |
| 6,598,068 B1 | * | 7/2003 | Clark | G06F 9/52 718/104 |

(Continued)

FOREIGN PATENT DOCUMENTS

GB      2449455 A2      11/2008

OTHER PUBLICATIONS

S. Zhuravlev, et al., "Addressing Shared Resource Contention in Multicore Processors via Scheduling", ASPLOS'10, Mar. 13-17, 2010, Pittsburgh, Pennsylvania, USA, ACM 2010, pp. 13.

*Primary Examiner* — Lewis A Bullock, Jr.
*Assistant Examiner* — Gilles R Kepnang
(74) *Attorney, Agent, or Firm* — Konrad Raynes Davda & Victor LLP; David W. Victor

(57) ABSTRACT

Provided are a computer program product, system, and method for determining when to release a lock from a first task holding the lock to grant to a second task waiting for the lock. A determination is made as to whether a holding of a lock to the resource by a first task satisfies a condition and whether the lock is swappable. The lock is released from the first task and granted to a second task waiting in a queue for the lock in response to determining that the holding of the lock satisfies the condition and that the lock is swappable. The first task is indicated in the queue waiting for the lock in response to granting the lock to the second task.

25 Claims, 6 Drawing Sheets

(56) References Cited

U.S. PATENT DOCUMENTS

| | | | |
|---|---|---|---|
| 6,687,903 B1* | 2/2004 | Chalmer | G06F 8/67 |
| | | | 718/100 |
| 7,047,366 B1* | 5/2006 | Ezra | G06F 12/0804 |
| | | | 711/129 |
| 7,234,144 B2 | 6/2007 | Wilt et al. | |
| 7,237,241 B2 | 6/2007 | Chan et al. | |
| 7,539,678 B2* | 5/2009 | Demsey | G06F 21/6209 |
| 7,571,354 B2* | 8/2009 | Susarla | H04L 67/14 |
| | | | 707/999.008 |
| 8,392,640 B2 | 3/2013 | Housty | |
| 8,769,546 B2* | 7/2014 | Nair | G06F 9/524 |
| | | | 710/200 |
| 8,918,793 B2 | 12/2014 | Balko | |
| 8,966,147 B2* | 2/2015 | Wang | G06F 9/524 |
| | | | 710/200 |
| 9,176,787 B2 | 11/2015 | Low et al. | |
| 10,628,221 B1* | 4/2020 | Veprinsky | G06F 9/5038 |
| 2004/0225922 A1* | 11/2004 | Susarla | H04L 69/40 |
| | | | 714/38.12 |
| 2008/0168454 A1* | 7/2008 | Choi | G06F 9/524 |
| | | | 718/103 |
| 2009/0254555 A1* | 10/2009 | Balakrishnan | G06F 11/3664 |
| 2009/0271793 A1* | 10/2009 | Rostedt | G06F 9/526 |
| | | | 718/103 |
| 2011/0246694 A1* | 10/2011 | Ichinose | G06F 9/526 |
| | | | 710/200 |
| 2012/0240126 A1* | 9/2012 | Dice | G06F 9/526 |
| | | | 718/104 |
| 2012/0297394 A1* | 11/2012 | Allen | G06F 9/4881 |
| | | | 718/103 |
| 2013/0339560 A1* | 12/2013 | Aoshima | G06F 9/52 |
| | | | 710/200 |
| 2014/0143787 A1* | 5/2014 | Bostic | G06F 16/245 |
| | | | 718/104 |
| 2015/0089509 A1* | 3/2015 | Brown | G06F 11/3419 |
| | | | 718/103 |
| 2017/0039234 A1* | 2/2017 | Wagle | G06F 16/2322 |
| 2018/0373573 A1* | 12/2018 | Sherlock | G06F 9/526 |

\* cited by examiner

DETERMINING WHEN TO RELEASE A LOCK FROM A FIRST TASK HOLDING THE LOCK TO GRANT TO A SECOND TASK WAITING FOR THE LOCK

BACKGROUND OF THE INVENTION

1. Field of the Invention

The present invention relates to a computer program product, system, and method for determining when to release a lock from a first task holding the lock to grant to a second task waiting for the lock.

2. Description of the Related Art

When data is read or updated, serialization mechanisms such as locks are required to maintain the integrity of the data. A task will hold the lock to a resource for the duration the resource still needs to be accessed to perform the task operations. If a holding task or job is waiting for additional resources to proceed, then other waiter tasks in a lock queue are prevented from accessing the lock until the holding task obtains the additional resources needed to use the resource for which the lock is held to perform operations. These delays may cause processing problems for other jobs that are prevented from proceeding until the job currently holding the lock can obtain all the additional resources it needs in order to use the resource covered by the lock.

In certain serialization operations, when a job is holding a resource and waiting for another resource, the held resource is not available to other jobs for the length of the serialization period. In order for another job to use the resource that is already serialized, the resource has to be completely released by the holding job or task. Releasing the resource requires the holding job or task to reissue the lock request and to be placed at the end of the lock queue to wait for that lock again in order to access the resource and complete its operations.

Described embodiments provide improved techniques for managing the locks when a task holding the lock to a resource is waiting for additional resources to become available before the resource to which the held lock applies can be used to perform the job or task operations.

SUMMARY

Following are examples of certain, but not all, embodiments.

A first example embodiment comprises a computer program product, system, and method for determining when to release a lock from a first task holding the lock to grant a second task waiting for the lock. A determination is made as to whether a holding of a lock to the resource by a first task satisfies a condition and whether the lock is swappable. The lock is released from the first task and granted to a second task waiting in a queue for the lock in response to determining that the holding of the lock satisfies the condition and that the lock is swappable. The first task is indicated in the queue waiting for the lock in response to granting the lock to the second task.

With the first example embodiment, a first task holding a lock is forced to release the lock if a condition is satisfied and the lock is swappable to grant to a second task waiting in a queue. This prevents the first task from holding the lock for an extended period that affects performance of other tasks waiting in a queue to access the lock. The first task releasing the lock may then have the lock returned so it can continue processing because the first task is added back to the queue. The first example embodiment forces a task that is holding a lock to a resource from preventing other tasks from accessing the resource in response to a condition being satisfied while the holding task may be waiting for additional resources to become available. In such case, the holding task may release the lock to other tasks in the queue so they can perform their operations. This limits the, delays to other queued tasks resulting from the holding task waiting for additional resources before using the resource associated with the lock.

In a second example embodiment, the first example embodiment can optionally include that the holding of the lock satisfies the condition when the first task holds the lock for a predetermined time.

With the second example embodiment, the task holding the lock for a predetermined time considered a substantial delay will release the lock if the lock is swappable to another task waiting for the lock. This time limit prevents a task holding the lock from delaying other tasks in the queue from accessing the resource if the lock is swappable.

In a third example embodiment, the first example embodiment can optionally include that the queue includes a plurality of tasks waiting for the lock, wherein the second task to which the lock is granted is a first waiter in the queue to receive the lock when released, and wherein the first task is added to the queue as the first waiter in the queue to receive the lock when released by the second task.

With the third example embodiment, the first task releasing the lock is added as the first waiter in the queue so it will immediately have the lock returned after the second task to which the lock is granted is finished processing the resource. This allows the first task releasing its lock before operations completed to be the first waiter in the queue so it may immediately continue operations using the resource when the task to which the lock was granted releases the lock. Further, if the first task was waiting for additional resources that were needed in order to process the resource covered by the lock, then those resources may be available for the first task to use when the lock is returned to the first task when it is added back to the queue.

In a fourth example embodiment, the first example embodiment can optionally include indicating the lock as swappable when the first task or second task holding the lock is waiting for at least one additional resource while holding the lock that is needed to complete a task operation using the resource; and indicating the lock as unswappable in response to at least one of: the first task or second task holding the lock initiating processing of the resource to perform the task operation; the first task or the second task holding the lock changing content of the resource; the first task or the second task holding the lock obtaining access to the at least one additional resource needed to complete the task operation using the resource for which the lock is held; and the first task or the second task holding the lock obtaining at least one lock to the at least one additional resource needed to complete the task operation using the resource for which the lock is held, wherein when the releasing the lock from the first task and the granting the lock to the second task are only performed if the lock is indicated as swappable and not indicated as unswappable.

With the fourth example embodiment, the lock is indicated as unswappable which means the holding task cannot release the lock even if the conditions for releasing the lock are satisfied, such as time limit expiring. The lock may be indicated as unswappable if certain conditions occur, such as the task holding the lock is processing the resource or changing content of the resource. In such case, the lock does not need to be released because the holding task is not anymore being delayed by having to wait for additional resources to become available. Further, if the holding task obtains access to the additional resources that were needed to process the resource associated with the lock, then the lock is indicated as unswappable because now the holding task will not be delayed in processing the resource governed by the lock because it no longer has to wait for additional resources to become available. Thus, with the fourth example embodiment, the lock is indicated as unswappable when there are no further delays to the holding task processing the lock, such as waiting for additional resources, and the holding task is allowed to continue holding the lock so it may complete its operations requiring the resource covered by the lock.

In a fifth example embodiment, the first example embodiment can optionally include that a swap operation comprises the releasing the lock, the granting the lock, and the indicating the first task in the queue waiting for the lock, wherein the holding of the lock does not satisfy the condition if the swap operation has been performed a maximum number of times to release the lock to grant to a task having a lower priority than the first task before the first task has released the lock after completing a task operation using the resource of the lock.

With the fifth example embodiment, the swap is not performed if the holding task has already been forced to release the lock to another waiter in the queue a maximum number of times. This ensures that the holding task is allowed to complete its operations requiring the resource without being continually interrupted by placing a limit on the number of times the holding task is forced to prematurely release the lock and interrupt operation processing.

A sixth example embodiment comprises a computer program product, system, and method for determining when to release a lock from a first task holding the lock to grant to a second task waiting for the lock. A determination is made as to whether a lock to the resource has been held by a first task for a predetermined time while the first task waits for at least one additional resource. The lock is released from the first task and granted to a second task waiting in a queue for the lock in response to determining that the first task has held the lock for the predetermined time while waiting for the at least one additional resource. The first task is indicated in the queue waiting for the lock in response to granting the lock to the second task.

With the sixth example embodiment, a first task holding a lock is forced to release the lock if the lock has been held for a predetermined time while the first task is waiting for additional resources before it can process the resource governed by the lock. This forces the first task to release the lock if it has been waiting for other resources before it can begin processing the resource of the lock. Other tasks waiting in the queue can now be allowed to access the lock and resource of the lock due to the holding task not using the resource for a predetermined time. The first task releasing the lock may then have the lock returned so it can continue processing because the first task is added back to the queue.

DETAILED DESCRIPTION

Described embodiments provide techniques to allow a next waiter in the lock queue to swap positions with the holding task holding the lock when the holding task is not able to obtain all the resources that are required in order to use the resource for which the lock is held to complete task operations. When the waiter task to which the lock is granted completes processing the resource, the lock may then be returned to the task which released the lock which was returned to the lock queue, such as in the position of the first waiter in the lock queue. This prevents a lockout situation, where two different tasks hold locks to resources each of the other tasks needs to proceed, by forcing one of the tasks holding one of the required locks to release the lock so the other task can complete using the resource for which it has the lock and then release the lock for the other task to reacquire and continue with task operations.

Figure 1:
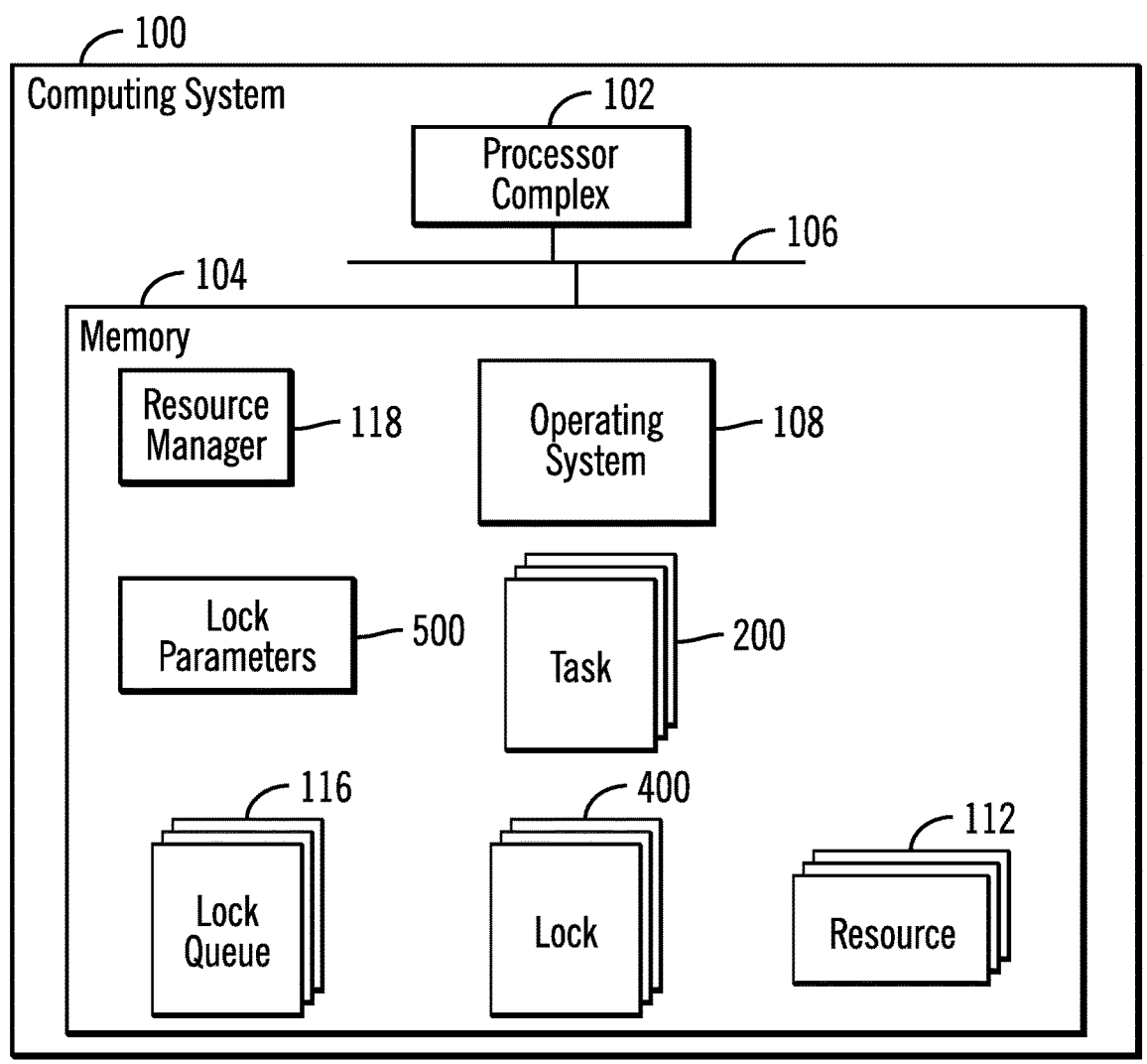
FIG. 1 illustrates an embodiment of a computing environment.

FIG. 1 illustrates an embodiment of a computing system 100 having a processor complex 102 that may access a memory 104 over a system bus 106. The memory 104 includes an operating system 108 that may spawn tasks 200 that seek to access resources 112, which may be in the memory 104 (as shown) or in some other location, to perform task operations. To obtain a resource $112_i$, the task $200_i$ requesting the resource $112_i$ must obtain a lock $400_i$ to access the resource $112_i$, where the locks 400 serialize access to their respective resources 112. If task $200_H$ is holding the lock $400_i$, then a requesting task $200_W$ becomes a waiter in the lock queue $116_i$ for the requested lock $400_i$ to wait for the lock $400_i$ to become available. A resource manager 118 may manage the locks 400. Alternatively, the tasks 200 may independently manage the locks 400. User configurable lock parameters 500 provide parameters used to determine when to perform a swap operation to allow a first waiter task $200_{W1}$ in the lock queue 116 to swap positions with the task $200_H$ holding the lock. A swap operation involves releasing the lock $400_i$ from the holding task $200_H$ currently holding the lock $400_i$, granting the lock $400_i$ to a first waiter task $200_{W1}$ in the lock queue $116_i$ for the $400_i$, and add the released holding task back to the queue $116_i$, such as in the first waiter position, to be the next task to be granted the lock $400_i$ so it may return to completing the task operation which required the resource. The previous holding task may also be added to different points in the queue $116_i$ than the position of the first waiter.

The resource 112 may comprise data objects, files in a file system implemented in the operating system 108, database objects, such as tables, rows, columns, tablespaces, etc., applications and functions, storage resources, memory resources, etc. In further embodiments, the resources 112 being serialized by the locks 400 may comprise internal devices to the computing system 100, such as adaptors, storage devices, etc., or external computing resources external to the computing system 100, such as machines, robots, external devices, external storage, etc.

The operating system 108 may initialize tasks 200 in response to requests from host systems (not shown) that communicate requests to access the resource 112 or in response to application requests from applications executing in the computing system 100.

Figure 2:
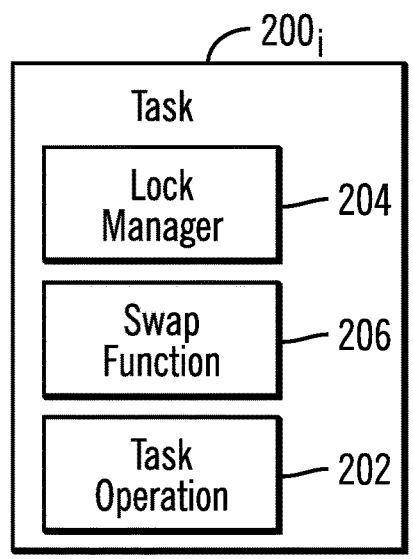
FIG. 2 illustrates an embodiment of a task.

FIG. 2 illustrates an embodiment of a task $200_i$ which includes task operation 202 code, lock manager 204 code for embodiments where the tasks 200 independently manage lock operations, and a swap function 206. The swap function 206 is called by the lock manager 204 to perform a swap operation which involves release the lock $400_i$ from the current holding task $200_H$, grant the lock $400_i$ to a first waiter task $200_{W1}$ in the lock queue $116_i$, and add the task $200_i$ (previous holding task) releasing the lock $400_i$ as the first waiter in the lock queue $116_i$. A first waiter task $200_{W1}$ in the queue $116_i$ comprises the next task in the queue to be provided the lock $400_i$. Lock queues 116 may comprise First-in-First-Out (FIFO) queues, where the oldest entry at the head of the queue 116 is processed first. In embodiments where the resource manager 118 manages the locks 400, the task $200_i$ may not include the lock manager 204 and swap function 206 code.

The task operation 202 may require access to multiple resources 112 and the shared and/or exclusive locks 400 for those resources to complete a task operation 202.

Figure 3:
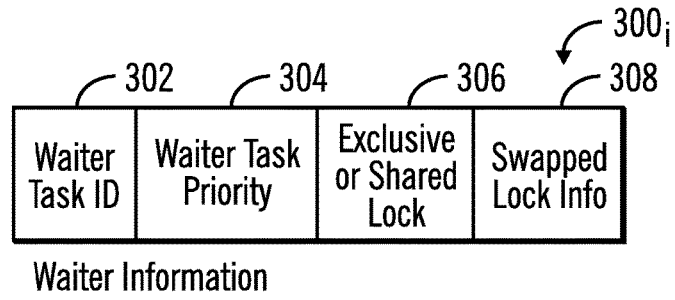
FIG. 3 illustrates an embodiment of waiter information for a waiter task in a lock queue waiting for the lock.

FIG. 3 illustrates an embodiment of an instance of waiter information $300_i$ maintained in an entry in one of the lock queues 116 for a task waiting for the lock $400_i$ associated with the lock queue $116_i$ in which the waiter information $300_i$ is queued. The waiter information $300_i$ includes a waiter task identifier (ID) 302, a waiter task priority 304, indication of whether the lock request is for exclusive or a shared lock 306, for a write or read, respectively; and swapped lock information 308 providing the lock information $400_i$ of FIG. 4 at the time the lock was swapped if the waiter task 302 comprises a holding task $200_H$ that released the lock $400_i$ as a result of a swap operation. The swapped lock information 308 allows the swapped task to revert to its lock state at the time the swap operation occurred for use when it reacquires the lock after the swap.

Figure 4:
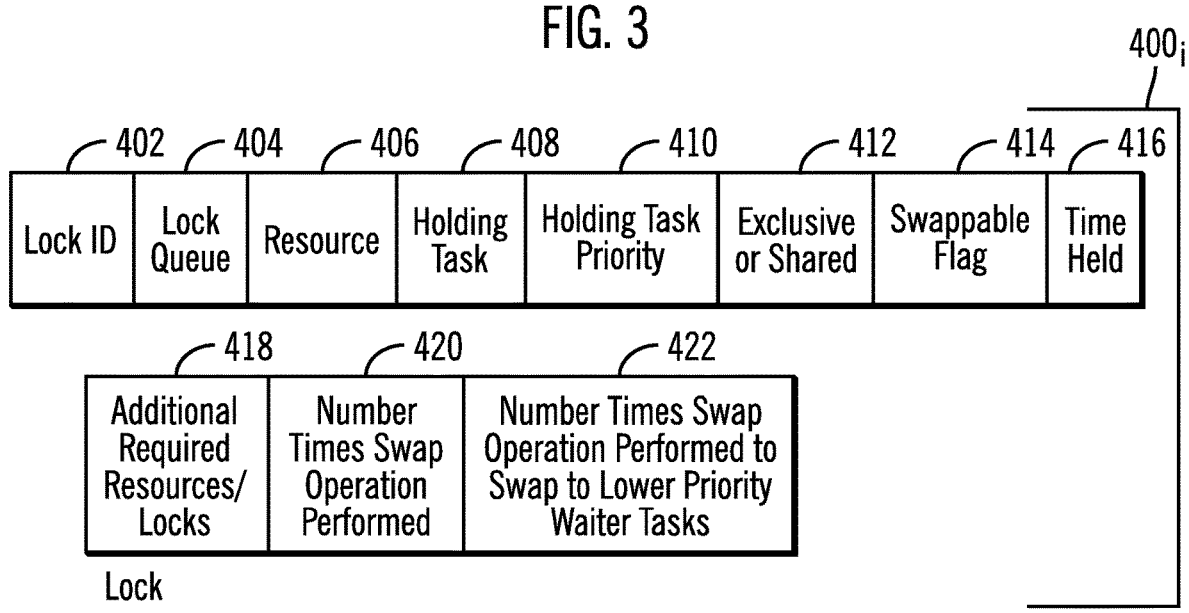
FIG. 4 illustrates an embodiment of lock information used to manage the lock to a resource.

FIG. 4 illustrates an embodiment of a lock $400_i$, which may include a lock ID 402 identifying the lock $400_i$; a lock queue 404 comprising one of the lock queues 116 that queue shared and exclusive requests for the lock 402; a resource 406 whose access is serialized by the lock 402; the holding task 408 (also referenced as holding task $200_H$) currently holding the lock 402; a holding task priority 410 assigned by the operating system 108; exclusive or shared 412 indication of whether the currently held lock is exclusive or shared; a swappable flag 414 indicating whether the holding task $200_H$ may swap positions with and release the lock to a waiter task $200_W$ if certain conditions are satisfied; a time the lock is held 416 by the holding task 408; zero or more additional required locks 418 that are required to be held in order to use the resource 406 to complete the task operation 202 of the holding task 408; a number of times a swap operation is performed 420 before the holding task 408 releases the lock upon completing the task operation 202; and a number of times a swap operation is performed to swap to a lower priority waiter task 422 before the holding task 408 releases the lock upon completing the task operation 202.

Figure 5:
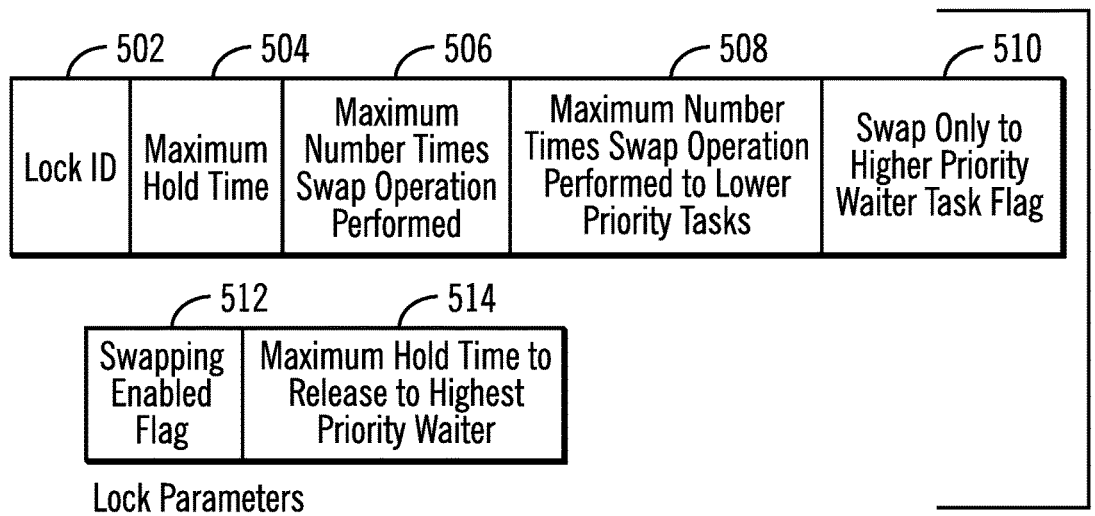
FIG. 5 illustrates an embodiment of lock parameters used to determine when to force a task holding the lock to release the lock and be placed on the lock queue.

FIG. 5 illustrates an embodiment of user settable lock parameters 500 used to determine when to perform the swap operation, and includes: a lock ID 502 identifying the lock $400_i$ to which the parameters applies, where one instance of the lock parameters 500 may apply to one, multiple or all the locks/resources; a maximum hold time 504 that a holding task $200_H$ can hold the lock 502 while waiting to access additional resources; a maximum number times swap operation performed 506 indicating a maximum number of allowed swaps to avoid starving the holding task $200_H$ from being able to complete its task operation 202; a maximum number times swap operation performed to lower priority tasks 508 indicating a limit on the number of times a swap operation is performed to lower priority tasks than the holding task $200_H$ priority, where the maximum swap number for lower priority tasks 508 may be less than the maximum number 506 for swapping to any priority task, which may be higher or lower than the priority of the holding task $200_H$; a swap only to higher priority waiter task flag 510 indicating that a swap operation may only be performed to a waiter task $200_W$ having higher priority than the holding task $200_H$; a swapping enabled flag 512 indicating whether swapping is enabled or disabled; and a maximum hold time to release to a highest priority waiter 514, which indicates a maximum hold time the holding task $200_H$ can hold the lock while waiting to access additional resources when the first waiter $200_{W1}$ has a highest priority, which may comprise an exclusive access request. The maximum hold time 514 may be less than the general maximum hold time 504, because a swap operation is more urgent when the first waiter $200_{W1}$ has the highest priority.

Figure 6:
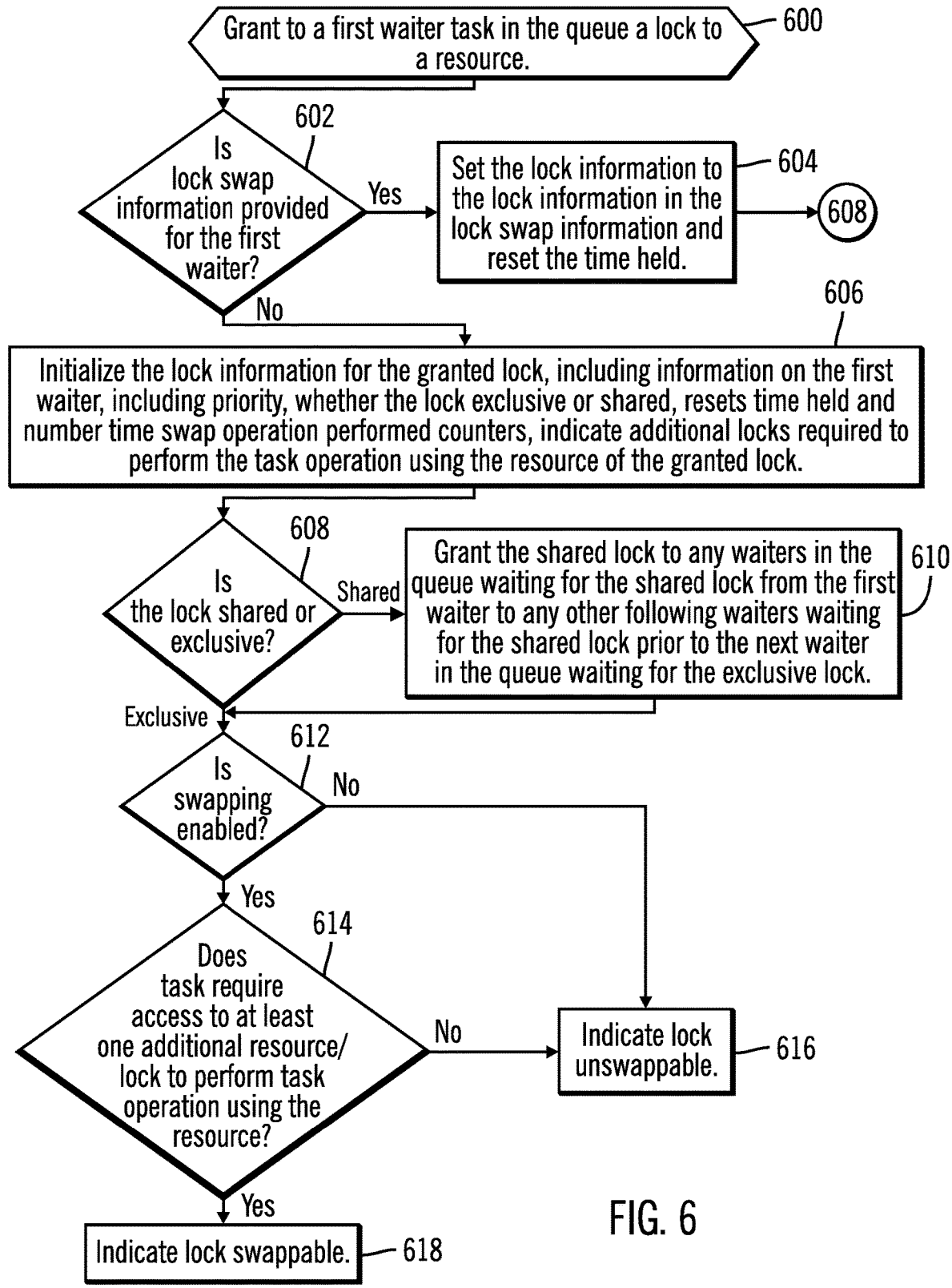
FIG. 6 illustrates an embodiment of operations to grant to a first waiter task in the lock queue a lock to a resource.

FIG. 6 illustrates an embodiment of operations to grant to a first waiter task $200_{W1}$ in the lock queue $116_i$ a lock $400_i$ for a resource $112_i$ as performed by the resource manager 118 or the lock manager 204 in a task $200_i$, such as the first waiter task $200_{W1}$ and/or the holding task $200_H$ releasing the lock $400_i$. Upon granting (at block 600) a lock $400_i$ to the first waiter task $200_{W1}$ in the lock queue $116_i$ for the lock $400_i$, if (at block 602) there is lock swap information 308 for the first waiter task $200_{W1}$, which is the case if the first waiter task $200_{W1}$ previously released the lock $400_i$ as a result of a swap operation, then the lock information $400_i$ is set (at block 604) to the lock information in the lock swap information 308 and the time held 416 is reset. If (at block 602) there is no lock swap information 308 provided for the first waiter task $200_{W1}$, then the lock information $400_i$ is initialized (at block 602) to include information on the first waiter $200_{W1}$ as the holding task 408, including its priority 410, whether the lock is shared or exclusive 412, resets the time held 416, indicates whether there are additional resources and required locks 418 the new holding task 408 needs to complete the task operation 202 using the resource $112_i$ of the granted lock $400_i$, and resets the number of times 420 and 422 counters. After updating the lock $400_i$ information for the new holder task, from block 604 or 606, if (at block 608) the granted lock is shared, then a shared lock $400_i$ is further granted (at block 610) to any waiter tasks $200_W$ in the queue waiting for the shared lock from the first waiter to other following waiters waiting for the shared lock prior to the next waiter waiting for an exclusive lock. If (at block 604) the lock is exclusive or after granting the shared lock to further waiting tasks (at block 610), if (at block 612) swapping is not enabled, as indicated in the swapping enabled flag 512 of the lock parameters $500_i$, then the swappable flag 414 is indicated (at block 612) as not swappable. If (at block 612) the swapping is enabled, as indicated in the enabled flag 512, and if (at block 614) the first waiter task $200_{W1}$ granted the lock, i.e., new holding task $200_H$, requires at least one additional resource/lock to perform the task operation 202 using the resource $112_i$ for which the lock $400_i$ was granted, then the lock $400_i$ is indicated (at block 618) as swappable in flag 414. If (at block 616) the new holding task $200_H$ does not require access to at least one additional resource to complete the task operation 202, then the lock is indicated as unswappable.

In the described operations of FIG. 6, the granted lock is indicated as swappable or unswappable depending on whether the new holding task $200_H$ will need to wait for at least one additional resource to use the resource $112_i$ for which the lock $400_i$ was granted. In further embodiments, the lock may be indicated as swappable in response to other events.

Figure 7:
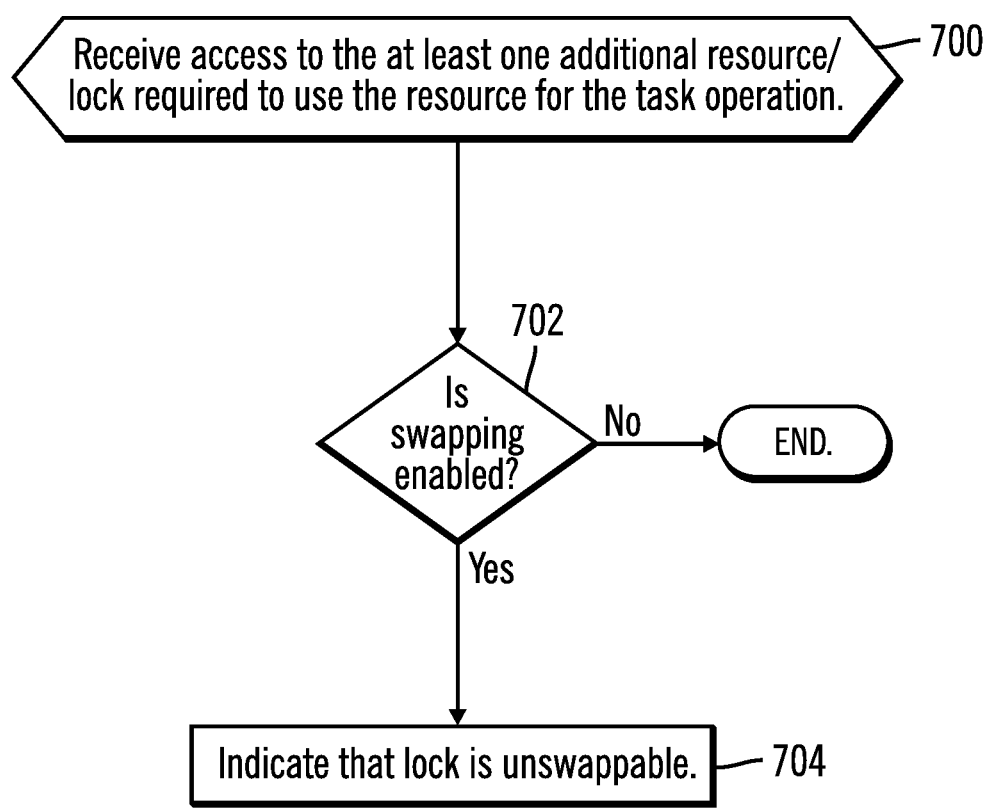
FIG. 7 illustrates an embodiment of operations performed when a holding task holding the lock receives access to additional resources required to use the resource of the lock.

FIG. 7 illustrates an embodiment of operations performed by the holding lock $200_H$ lock manager 204 upon receiving (at block 700) access (e.g., a lock $400_i$) to all of the at least one additional resource 418 required to use the resource $112_i$ for which the lock $400_i$ is held. If (at block 702) swapping is enabled, as indicated in the swappable flag 414, then the lock $400_i$ is indicated as unswappable. If (at block 702) swapping is not enabled, as indicated in the swappable flag 414, control ends.

Figure 8:
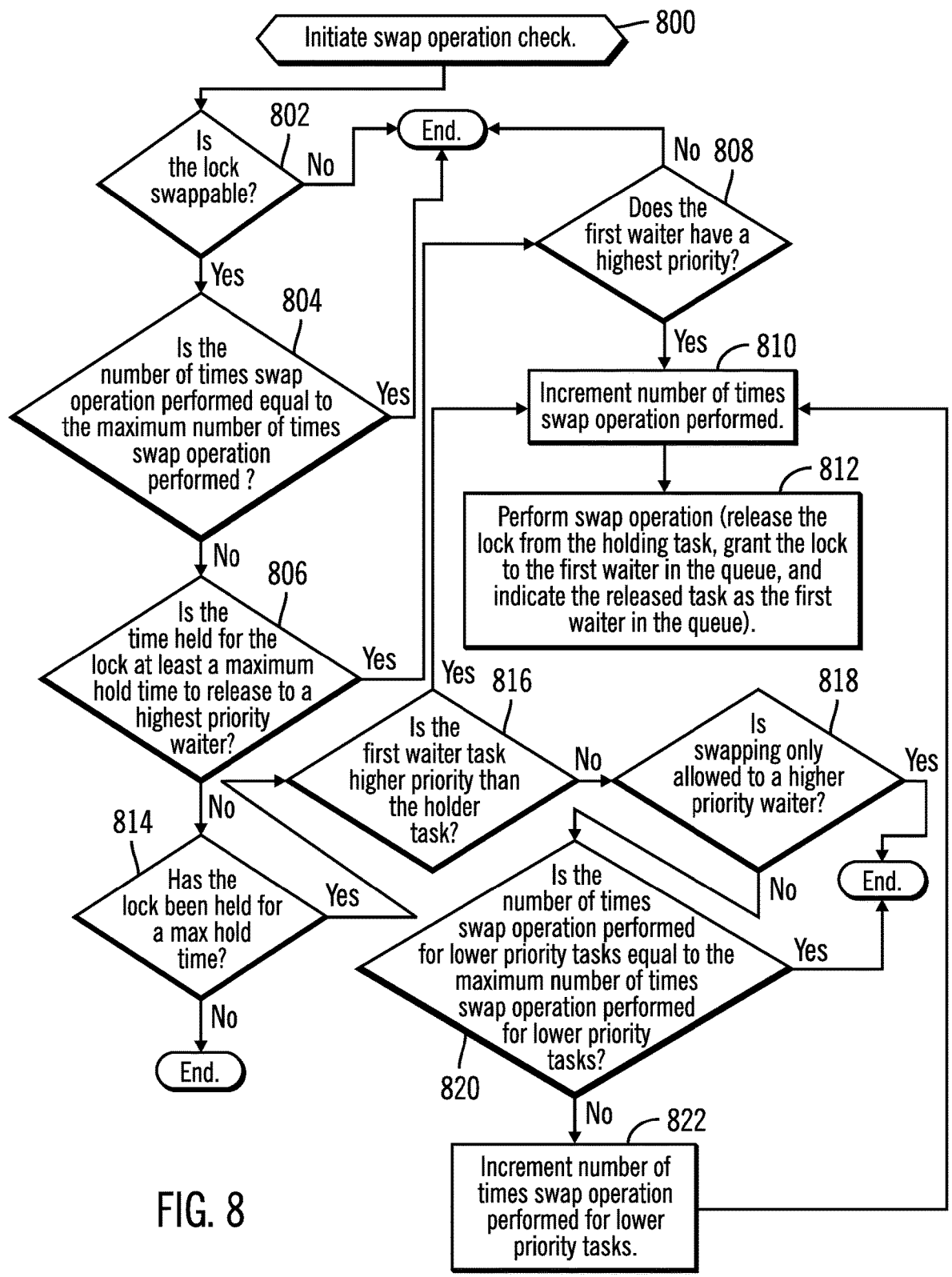
FIG. 8 illustrates an embodiment of operations to determine when to initiate a swap operation to have the holding task holding the lock release the lock and grant the lock to a waiter task in the wait queue.

FIG. 8 illustrates an embodiment of operations to determine whether to perform a swap operation, which may be performed by the resource manager 118 or the lock manager 204 in the task $200_H$ holding the lock $400_i$ for which the swap operation check is performed. Upon initiating (at block 800) the swap operation check for a held lock $400_i$, if at (at block 802) the lock is not swappable, as indicated in the swappable flag 414, then control ends with no swap operation being performed. If (at block 802) the lock $400_i$ is swappable and if (at block 804) the number of times swap operation performed 420 is equal to the maximum number of times swap operation performed 506 limit, then control ends because the maximum number of times to interrupt the holding task $200_H$ occurred. If (at block 804) the holding task $200_H$ has not been swapped the maximum number of times 506, then if (at block 806) the time held 416 for the lock $400_i$ is at least the maximum hold time to release the lock to a highest priority waiter 514, then a determination is made (at block 808) whether the first waiter task $200_{W1}$ has the highest priority, such as is requesting an exclusive lock. If (at block 808) the first waiter task $200_{W1}$ does not have the highest priority, then control ends without swapping. If (at block 808) the first waiter task $200_{W1}$ does have the highest priority, then the swap may occur and the number of times the swap operation performed 506 is incremented (at block 810) and a swap operation is performed (at block 812), which involves releasing the lock $400_i$ from the holding task $200_H$, grant the lock $400_i$ to the first waiter task $200_{W1}$ in the lock queue $116_i$, and add the holding task from which the lock was released as the first waiter in the lock queue $116_i$.

If (at block 806) the time held 416 for the lock $400_i$ is less than a maximum hold time to release to a highest priority waiter 514 and if (at block 814) the time held 416 is at least the maximum hold time 504 to hold the lock $400_i$, then a determination is made (at block 816) whether the first waiter task $200_{W1}$ in the lock queue $116_i$ has a higher priority than the holder task $200_H$. If (at block 816) the first waiter task $200_{W1}$ has a higher priority, then control proceeds to blocks 810 and 812 to perform the swap operation. If (at block 816) the first waiter task $200_{W1}$ has a lower priority and if (at block 818) swapping is only allowed to a higher priority waiter task $200_{W1}$, as indicated in the swap only to higher priority waiter task flag 510, then control ends without swapping. Otherwise, if (at block 818) swapping to a lower priority first waiter task $200_{W1}$ is allowed, then a determination is made (at block 820) as to whether a number of times swap operation performed to swap to lower priority waiter tasks 422 is equal to the maximum number of times swap operation performed for lower priority tasks 508. If (at block 820) the number of swap operations to lower priority tasks 422 is the maximum 508, then control ends as the maximum number of swaps to lower priority waiter tasks has been met. Otherwise, if (at block 820) the maximum number of swaps to lower priority tasks has not occurred, then the number of times swap operation performed to swap to lower priority waiter tasks 422 is incremented (at block 822) and control proceeds to block 810 to perform the swap positions with the lower priority first waiter task $200_{W1}$.

With the described embodiments, a lock for a resource is prevented from being held beyond a predetermined time by a holding task while the holding task is waiting for at least one additional resource to access before the resource can be used to perform a task operation by the holding task. When the lock is held beyond the predetermined or maximum time and the lock is swappable, then the lock may be released from the holding task and granted to a first waiter task in the lock queue, and the holding task that released the lock is added as the first waiter in the queue so that it may be provided the lock again when the new holder releases so it can access the resource and complete the task operation. Other factors may also be considered before a holding task has its lock swapped, such as whether a maximum number of swap operations have occurred and whether a swap may occur to a lower priority first waiter task in the lock queue.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
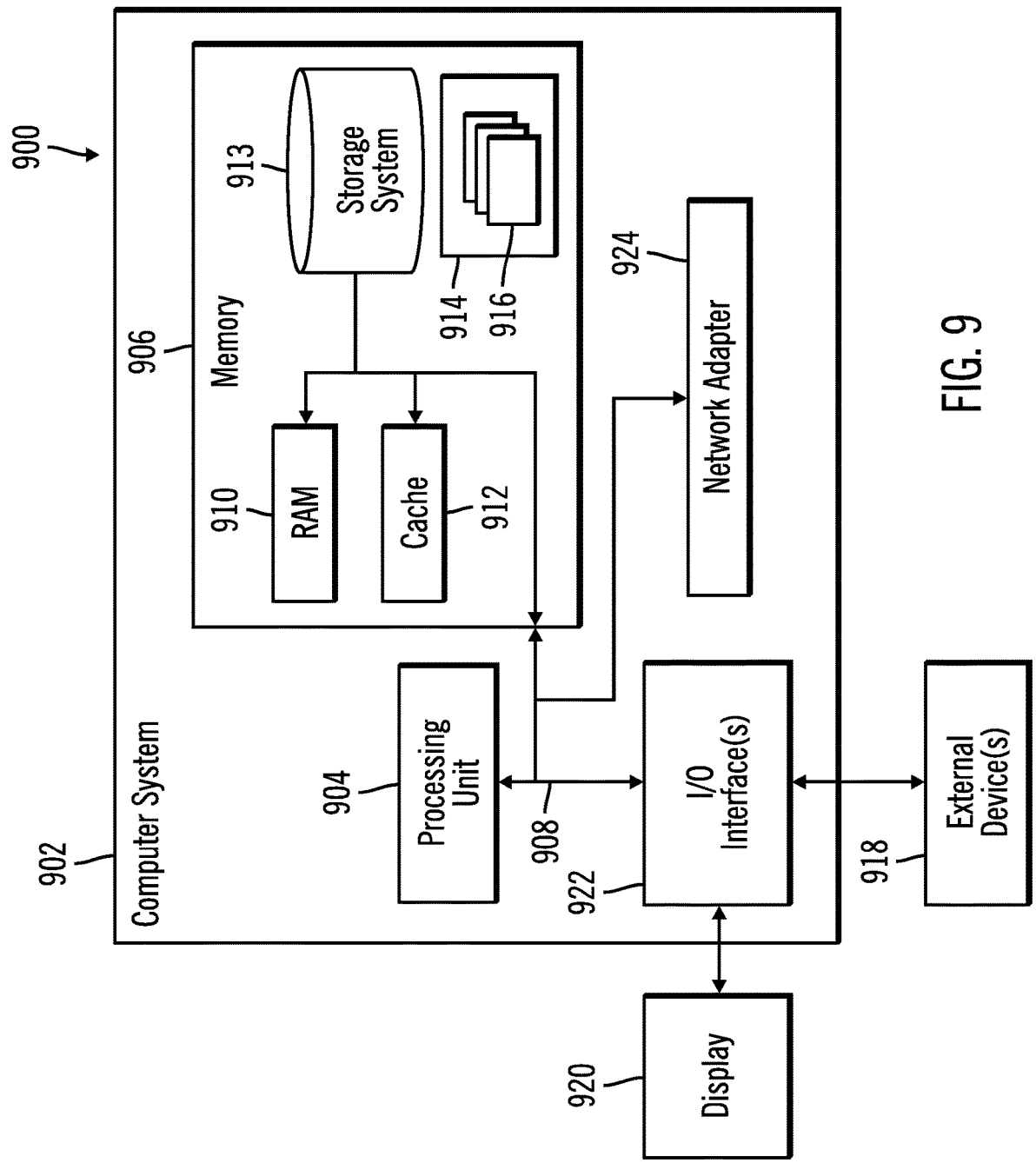
FIG. 9 illustrates a computing environment in which the components of FIG. 1 may be implemented.

The computing system 100 of FIG. 1 may further include components as described with respect to a computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing access to a resource in a computer system, the computer program product comprising a computer readable storage medium having computer readable program code embodied therein that when executed performs operations, the operations comprising:
   indicating a lock as swappable in response to a first task holding the lock to a first resource while the first task is waiting for a second resource needed to complete a task operation using the first resource;
   determining whether the lock is swappable;
   determining whether the first task has held the lock for a predetermined time;
   determining whether the first task has a lower priority than a second task waiting for the lock;
   determining whether a number of times the lock has been previously swapped to a lower priority task is a maximum number of times in response to determining that the first task has a higher priority than the second task;
   in response to determining that the lock is swappable, that the lock has been held the predetermined time, and that the first task has a lower priority than the second task, releasing the lock from the first task and granting the lock to the second task waiting in a queue for the lock;
   in response to determining that the lock is swappable, that the lock has been held the predetermined time, and that the number of times the lock has been previously swapped to a lower priority task is less than the maximum number of times, releasing the lock from the first task and granting the lock to the second task waiting in the queue for the lock;

placing the first task in the queue waiting for the lock in response to granting the lock to the second task; and accessing, by the second task, the resource and completing the task operation on the accessed resource, in response to being granted the lock.

2. The computer program product of claim 1, wherein the queue includes a plurality of tasks waiting for the lock, wherein the second task to which the lock is granted is a first waiter in the queue to receive the lock when released, and wherein the first task is added to the queue as the first waiter in the queue to receive the lock when released for the second task.

3. The computer program product of claim 1, wherein the operations further comprise:

indicating the lock as unswappable in response to at least one of:

the first task holding the lock and currently processing of the first resource to perform the task operation;

the first task holding the lock and currently changing content of the first resource;

the first task holding the lock and currently obtaining access to the second resource needed to complete the task operation using the first resource for which the lock is held;

the first task holding the lock and currently obtaining an additional lock to the second resource needed to complete the task operation using the first resource for which the lock is held; and the second task acquiring the lock to the resource and not requiring at least one additional resource to perform a task operation using the resource.

4. The computer program product of claim 1, wherein the first task holding the lock performs the determinations of: whether the first task has a lower priority than the second task; whether the number of times the lock has been previously swapped to a lower priority task is at least the maximum number of times; whether the first task has held the lock for a predetermined time; and whether the lock is swappable, wherein the operations further comprise:

calling, by the first task, a swap function to cause the releasing of the lock from the first task, the granting of the lock to the second task, and the indicating the first task in the queue waiting for the lock in response to the first task determining to grant the lock to the second task.

5. The computer program product of claim 1, wherein a resource manager monitoring tasks accesses to resources and locks to the resources performs the operations of determining whether the first task has a lower priority than the second task, whether the number of times the lock has been previously swapped to a lower priority task is at least the maximum number of times, whether the lock is swappable, the releasing the lock, the granting the lock, and the placing the first task in the queue waiting for the lock.

6. The computer program product of claim 1, wherein a swap operation comprises the releasing the lock, the granting the lock, and the indicating the first task in the queue waiting for the lock, and wherein the releasing the lock is performed if the first task has a lower priority than the second task waiting for the lock and the swap operation has not been performed the maximum number of times before the first task has released the lock after completing the task operation using the first resource of the lock.

7. The computer program product of claim 1, wherein a swap operation comprises the releasing the lock, the granting the lock, and the indicating the first task in the queue waiting for the lock, wherein the lock is not released if the swap operation has been performed a maximum number of times to release the lock to grant to a task having the lower priority than the first task.

8. The computer program product of claim 1, wherein the predetermined time comprises a predetermined time to release to a highest priority waiter, and wherein the releasing the lock is performed in response to determining that the second task waiting in the queue has a highest priority, and wherein the lock is not released in response to determining that the second task waiting in the queue does not have a highest priority.

9. The computer program product of claim 1, wherein the releasing the lock is performed in response to the first task having higher priority than the second task, swapping is not only allowed to a higher priority waiter, and the number of times the lock has been previously swapped to the lower priority task is not the maximum number of times.

10. The computer program product of claim 1, wherein the lock is not released in response to the first task having higher priority than the second task and swapping is only allowed to a higher priority waiter.

11. The computer program product of claim 1, wherein the maximum number of times comprises a first maximum number of times, wherein the operations further comprise:

determining whether a number of times the lock has been previously swapped comprises a second maximum number of times, wherein the lock is released from the first task and granted to the second task only if the lock has not been previously swapped the second maximum number of times.

12. A computer program product for managing access to a resource in a computer system, the computer program product comprising a computer readable storage medium having computer readable program code embodied therein that when executed performs operations, the operations comprising:

determining whether a first task, holding a lock to a first resource while waiting for a second resource needed to complete a task operation using the first resource, has held the lock to the first resource for a predetermined time, whether the first task has a lower priority than a second task waiting for the lock, and whether a number of times the lock has been previously swapped to a lower priority task is a maximum number of times in response to determining that the first task has a higher priority than the second task;

in response to determining that the lock is swappable, that the lock has been held the predetermined time, and that the first task has a lower priority than the second task, releasing the lock from the first task and granting the lock to the second task waiting in a queue for the lock;

in response to determining that the lock is swappable, that the lock has been held the predetermined time, and that the number of times the lock has been previously swapped to a lower priority task is less than the maximum number of times, releasing the lock from the first task and granting the lock to the second task waiting in a queue for the lock;

placing the first task in the queue waiting for the lock in response to granting the lock to the second task; and accessing, by the second task, the resource and completing the task operation on the accessed resource, in response to being granted the lock.

13. The computer program product of claim 12, wherein the lock comprises a first lock, wherein the waiting for the second resource comprises waiting for a second lock to the second resource, wherein the first task requires the first lock and the second lock in order to complete the task operation using the first resource.

14. The computer program product of claim 12, wherein the releasing the lock is performed if the first task has a lower priority than the second task waiting for the lock and the lock has not been previously swapped the maximum number of times before the first task has completed the task operation using the first resource of the lock and released the lock.

15. A system for managing access to a resource, comprising:
   a processor; and
   a computer readable storage medium having computer readable program code embodied therein that when executed by the processor performs operations, the operations comprising:
      indicating a lock as swappable in response to a first task holding the lock to a first resource while the first task is waiting for a second resource needed to complete a task operation using the first resource;
      determining whether the lock is swappable;
      determining whether the first task has held the lock for a predetermined time;
      determining whether the first task has a lower priority than a second task waiting for the lock;
      determining whether a number of times the lock has been previously swapped to a lower priority task is a maximum number of times in response to determining that the first task has a higher priority than the second task;
      in response to determining that the lock is swappable, that the lock has been held the predetermined time, and that the first task has a lower priority than the second task, releasing the lock from the first task and granting the lock to the second task waiting in a queue for the lock;
      in response to determining that the lock is swappable, that the lock has been held the predetermined time, and that the number of times the lock has been previously swapped to a lower priority task is less than the maximum number of times, releasing the lock from the first task and granting the lock to the second task waiting in the queue for the lock;
      placing the first task in the queue waiting for the lock in response to granting the lock to the second task; and
      accessing, by the second task, the resource and completing the task operation on the accessed resource, in response to being granted the lock.

16. The system of claim 15, wherein the queue includes a plurality of tasks waiting for the lock, wherein the second task to which the lock is granted is a first waiter in the queue to receive the lock when released, and wherein the first task is added to the queue as the first waiter in the queue to receive the lock when released by the second task.

17. The system of claim 15, wherein the operations further comprise:
   indicating the lock as unswappable in response to at least one of:
      the first task holding the lock and currently processing of the first resource to perform the task operation;
      the first task holding the lock and currently changing content of the first resource;
      the first task holding the lock and currently obtaining access to the second resource needed to complete the task operation using the first resource for which the lock is held;
      the first task holding the lock and currently obtaining an additional lock to the second resource needed to complete the task operation using the first resource for which the lock is held; and
      the second task acquiring the lock to the resource and not requiring at least one additional resource to perform a task operation using the resource.

18. The system of claim 15, wherein a swap operation comprises the releasing the lock, the granting the lock, and the indicating the first task in the queue waiting for the lock, and wherein the releasing the lock is performed if the first task has a lower priority than the second task waiting for the lock and the swap operation has not been performed the maximum number of times to release the lock to grant to a task having a lower priority than the first task before the first task has released the lock after completing the task operation using the first resource of the lock.

19. The system of claim 15, wherein a swap operation comprises the releasing the lock, the granting the lock, and the indicating the first task in the queue waiting for the lock, wherein the lock is not released if the swap operation has been performed a maximum number of times to release the lock to grant to a task having the lower priority than the first task before the first task has released the lock after completing a task operation using the first resource of the lock.

20. The system of claim 15, wherein the predetermined time comprises a predetermined time to release to a highest priority waiter, wherein lock is not released in response to determining that the second task waiting in the queue has a highest priority, and wherein the lock is not released in response to determining that the second task waiting in the queue does not have a highest priority.

21. A method for managing access to a resource in a computer system, comprising:
   indicating a lock as swappable in response to a first task holding the lock to a first resource while the first task is waiting for a second resource needed to complete a task operation using the first resource;
   determining whether the lock is swappable;
   determining whether the first task has held the lock for a predetermined time
   determining whether the first task has a lower priority than a second task waiting for the lock;
   determining whether a number of times the lock has been previously swapped to a lower priority task is a maximum number of times in response to determining that the first task has a higher priority than the second task;
   in response to determining that the lock is swappable, that the lock has been held the predetermined time, and that the first task has a lower priority than the second task, releasing the lock from the first task and granting the lock to the second task waiting in a queue for the lock;
   in response to determining that the lock is swappable, that the lock has been held the predetermined time, and that the number of times the lock has been previously swapped to a lower priority task is less than the maximum number of times, releasing the lock from the first task and granting the lock to the second task waiting in the queue for the lock;
   placing the first task in the queue waiting for the lock in response to granting the lock to the second task; and
   accessing, by the second task, the resource and completing the task operation on the accessed resource, in response to being granted the lock.

22. The method of claim 21, wherein the queue includes a plurality of tasks waiting for the lock, wherein the second task to which the lock is granted is a first waiter in the queue to receive the lock when released, and wherein the first task is added to the queue as the first waiter in the queue to receive the lock when released by the second task.

23. The method of claim 21, further comprising:
indicating the lock as unswappable in response to at least one of:
- the first task holding the lock currently and processing of the first resource to perform the task operation;
- the first task holding the lock and currently changing content of the first resource;
- the first task holding the lock and currently obtaining access to the second resource needed to complete the task operation using the first resource for which the lock is held;
- the first task holding the lock and currently obtaining an additional lock to the second resource needed to complete the task operation using the first resource for which the lock is held; and
- the second task acquiring the lock to the resource and not requiring at least one additional resource to perform a task operation using the resource.

24. The method of claim 21, wherein a swap operation comprises the releasing the lock, the granting the lock, and the indicating the first task in the queue waiting for the lock, and wherein the releasing the lock is performed if the first task has a lower priority than the second task waiting for the lock and the swap operation has not been performed the maximum number of times to release the lock to grant to a task having a lower priority than the first task before the first task has released the lock after completing the task operation using the first resource of the lock.

25. The method of claim 21, wherein a swap operation comprises the releasing the lock, the granting the lock, and the indicating the first task in the queue waiting for the lock, wherein lock is not released if the swap operation has been performed a maximum number of times to release the lock to grant to a task having the lower priority than the first task before the first task.

* * * * *